United States Patent
Lassen et al.

(10) Patent No.: US 10,855,065 B1
(45) Date of Patent: Dec. 1, 2020

(54) WEATHER-RESISTANT JUNCTION BOX

(71) Applicant: Elemental LED, Inc., Reno, NV (US)

(72) Inventors: Andrew Lassen, Reno, NV (US); David Greenspan, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 16/703,069

(22) Filed: Dec. 4, 2019

(51) Int. Cl.
*H02G 3/14* (2006.01)
*H02G 3/16* (2006.01)
*H05K 7/14* (2006.01)
*H02G 3/08* (2006.01)

(52) U.S. Cl.
CPC ............. *H02G 3/085* (2013.01); *H02G 3/088* (2013.01); *H02G 3/14* (2013.01); *H02G 3/16* (2013.01)

(58) Field of Classification Search
CPC ...... F21V 17/12; F21V 23/001; F21V 23/003; F21V 29/83; F21V 31/005; H02G 3/085; H02G 3/088; H02G 3/14; H02G 3/16; H02G 15/10; H05K 5/0091; H05K 5/03; H05K 7/14
USPC .......................................... 174/535; 220/3.94
See application file for complete search history.

(56) References Cited

U.S. PATENT DOCUMENTS

| | | | | |
|---|---|---|---|---|
| 2,656,948 A | * | 10/1953 | McGee | H01H 85/2045 220/3.8 |
| 3,690,501 A | | 9/1972 | Ware | |
| 3,895,179 A | * | 7/1975 | Wyatt | H02B 1/50 174/50 |
| 3,955,709 A | * | 5/1976 | Coley | B65D 43/24 220/812 |
| 5,076,455 A | * | 12/1991 | Begley | H02G 3/14 220/3.8 |
| 5,472,355 A | | 12/1995 | Wittmann | |
| 5,486,650 A | | 1/1996 | Yetter | |
| 5,594,207 A | | 1/1997 | Fabian et al. | |
| 5,596,174 A | | 1/1997 | Sapienza | |
| 5,962,811 A | | 10/1999 | Rodrigues et al. | |
| 6,037,541 A | | 3/2000 | Bartley et al. | |
| 6,091,023 A | | 7/2000 | O'Donnell | |

(Continued)

FOREIGN PATENT DOCUMENTS

DE 19501339 C1 8/1996
WO WO1998023015 A1 5/1998

OTHER PUBLICATIONS

U.S. Appl. No. 16/394,698, filed Apr. 25, 2019, Holleschau et al.

*Primary Examiner* — Timothy J Thompson
*Assistant Examiner* — Guillermo J Egoavil
(74) *Attorney, Agent, or Firm* — United IP Counselors, LLC

(57) ABSTRACT

A weather-resistant junction box is disclosed. The junction box includes a back panel and a number of sidewalls arising from the back panel to create an enclosure with an open face. A removable panel is constructed and arranged to cover and close the open face. A cap with an overhang extends over the top of the enclosure, extending out and down over the top portions of its sidewalls. Internally, the enclosure is divided by one or more partitions into a driver compartment and two or more connection compartments. Each of the connection compartments includes at least one opening, or a knock-out for the opening. All of the openings or knock-outs for all of the connection compartments may be located in the same panel of the junction box.

14 Claims, 4 Drawing Sheets

(56) References Cited

U.S. PATENT DOCUMENTS

| | | |
|---|---|---|
| 6,362,987 B1 | 3/2002 | Yurek et al. |
| 6,395,981 B1 | 5/2002 | Ford et al. |
| 6,595,381 B1 | 7/2003 | Johnson |
| 7,439,442 B2 | 10/2008 | Schutte |
| 7,499,261 B2 | 3/2009 | Hash |
| 7,952,022 B2 | 5/2011 | Rippel et al. |
| 7,988,332 B2 | 8/2011 | Lo et al. |
| 8,049,107 B2 | 11/2011 | Dinh |
| 8,107,226 B2 * | 1/2012 | Souligne ............... H02B 1/28 361/643 |
| 8,436,259 B2 | 5/2013 | Green et al. |
| 8,459,812 B2 | 6/2013 | Wu et al. |
| 8,739,997 B1 | 6/2014 | Ploof |
| 9,788,374 B1 | 10/2017 | Holleschau et al. |
| 9,951,934 B2 | 4/2018 | Buck et al. |
| 10,028,340 B2 | 7/2018 | Archer |
| 10,116,127 B1 | 10/2018 | Lopez-Martinez et al. |
| 10,349,476 B2 | 7/2019 | Holleschau et al. |
| 2003/0056964 A1 | 3/2003 | Lalancette et al. |
| 2003/0102143 A1 | 6/2003 | Sato et al. |
| 2006/0191697 A1 | 8/2006 | Cardenas et al. |
| 2007/0182338 A1 | 8/2007 | Shteynberg et al. |
| 2008/0105461 A1 | 5/2008 | King et al. |
| 2009/0065247 A1 | 3/2009 | Shelton et al. |
| 2010/0052577 A1 | 3/2010 | Brownlee |
| 2010/0088901 A1 | 4/2010 | Glancey et al. |
| 2012/0139745 A1 | 6/2012 | Makwinski |
| 2012/0292991 A1 | 11/2012 | Dodal et al. |
| 2013/0258682 A1 | 10/2013 | Pino et al. |
| 2013/0294041 A1 | 11/2013 | Syal |
| 2013/0319715 A1 | 12/2013 | Korcz et al. |
| 2014/0312776 A1 | 10/2014 | Park et al. |
| 2014/0375897 A1 | 12/2014 | Sugiura |
| 2015/0362164 A1 | 12/2015 | Levante et al. |
| 2016/0006202 A1 | 1/2016 | Dupuis et al. |
| 2017/0268758 A1 * | 9/2017 | Buck .................. H05K 5/03 |
| 2017/0367158 A1 | 12/2017 | Petersen et al. |
| 2019/0063737 A1 | 2/2019 | Buck et al. |

* cited by examiner

WEATHER-RESISTANT JUNCTION BOX

TECHNICAL FIELD

The invention relates to junction boxes.

BACKGROUND ART

A junction box is an enclosure in which electrical connections are made. Used for safety reasons, a junction box shields the electrical connection from damage and shields users from exposure to electricity. A junction box also serves as a fire enclosure—should a fire start around the electrical connection, the junction box contains the fire.

Simple junction boxes, typically metal or plastic enclosures with no internal partitions, have been known for many decades. However, with the increasing use of lighting based on light-emitting diodes (LED), junction boxes have seen more use and have grown more complex. This is because most LED lighting requires a driver, a component that converts the high-voltage, alternating-current (AC) power used in household and commercial power systems to the low-voltage, direct-current (DC) power that is used by most LED lighting. Other forms of lighting, such as low-voltage AC lighting, may also require a driver to produce the correct output voltage from line voltage. Electrical safety regulations in the United States and in some other jurisdictions require that, in many circumstances, connections to a driver must be made within a junction box. Those same safety regulations may also require that the high-voltage circuit and connections be physically separated from the low-voltage circuit.

U.S. Pat. Nos. 9,951,934 and 10,116,127, both of which are incorporated by reference in their entireties, provide examples of junction boxes adapted for use with drivers. In the first patent, an open layout allows for easy access to the interior of the junction box. In the second patent, compartments for making wire connections to the driver wrap around the compartment that holds the driver itself in order to minimize the overall size of the junction box.

Some junction boxes are designed for use indoors, and provide no particular protection against the elements, while other junction boxes are designed for outdoor use, or for use in extreme environments. Not all junction boxes designed for outdoor use, or for use in extreme environments, need be totally sealed against the environment. For example, in the United States, the National Electrical Manufacturers Association (NEMA) creates and promulgates standards for junction boxes and other electrical enclosures intended for various types of environments. The NEMA standards are divided into types. Of those types, NEMA Type 3 enclosures provide a measure of protection against the ingress of falling dirt, windblown dust, falling rain, sleet, and snow, and are undamaged by the external formation of ice.

Despite established standards for weather-resistant enclosures, there are few weather-resistant enclosures that accommodate drivers.

BRIEF SUMMARY

Aspects of the invention relate to junction boxes, and in particular, to weather-resistant junction boxes. A junction box according to one embodiment of the invention includes a back panel and a number of sidewalls arising from the back panel to create an enclosure with an open face. A removable panel is constructed and arranged to cover and close the open face. A cap with an overhang extends over the top of the enclosure, extending out and down over the top portions of its sidewalls. Internally, the enclosure is divided by one or more partitions into a driver compartment and two or more connection compartments. In some embodiments, the enclosure will be partitioned by one long partition that extends from one sidewall to the opposite sidewall, and by one shorter partition that extends perpendicularly from the long partition to the bottom panel of the enclosure. This makes the connection compartments adjacent to one another and to the driver compartment. Each of the connection compartments includes at least one opening, or a knock-out for the opening, in order to allow wires to enter and leave the junction box. All of the openings or knock-outs for all of the connection compartments may be located in the same panel of the junction box. For example, all of the openings or knock-outs may be located in the bottom panel.

Junction boxes according to aspects of the invention may have additional features that may help to protect against the elements. For example, the removable panel and the other panels of the enclosure may be constructed and arranged to overlap at joints. The upper extent of the removable panel may be covered by the overhang of the cap.

A weather-resistant junction box according to an aspect of the invention may carry any number of drivers. The driver compartment of the junction box will typically include structure for securing the drivers. That structure may vary from embodiment to embodiment, but may include, e.g., openings for fasteners to secure mounting hardware. In some cases, a single bracket may define specific positions for each driver in the compartment.

These and other aspects, features, and advantages of the invention will be set forth in the description that follows.

BRIEF DESCRIPTION OF THE DRAWING FIGURES

The invention will be described with respect to the following drawing figures, in which like numerals represent like features throughout the drawings, and in which.

DETAILED DESCRIPTION

Figure 1:
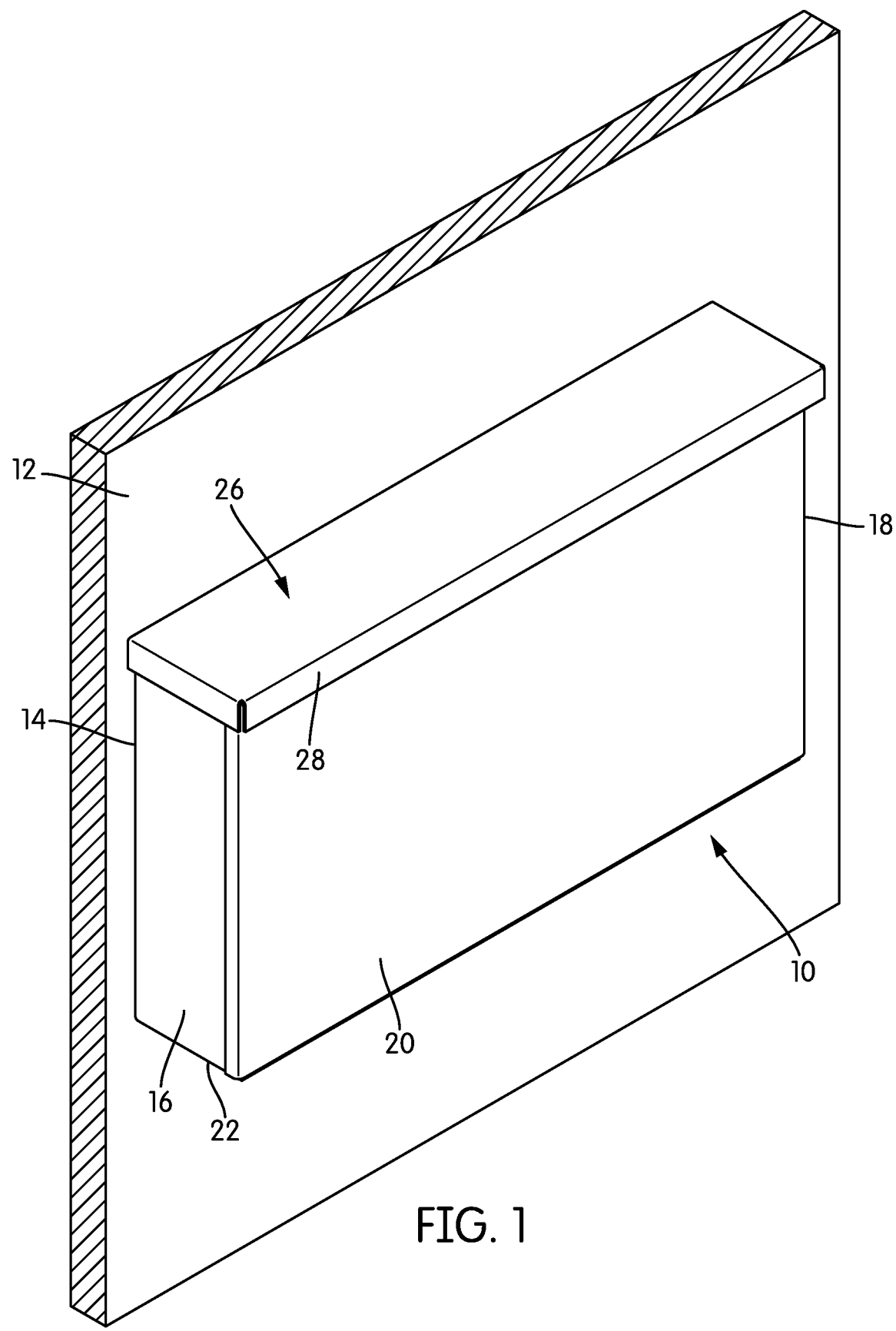
FIG. 1 is a perspective view of a weather-resistant junction box according to one embodiment of the invention, shown installed and closed.

FIG. 1 is a perspective view of a weather-resistant junction box, generally indicated at 10, according to one embodiment of the invention, shown as mounted on a vertical surface 12. In this description, the phrase "weather resistant" refers to the fact that the junction box 10 is intended to provide a degree of protection against the ingress of such elements as dirt, dust, rain, sleet, snow, and the like. The particular elements against which the junction box 10 protects will vary from embodiment to embodiment. A "weather resistant" junction box 10 as described here need not be completely sealed to the environment or impervious to all ingress, although some may be. Moreover, junction boxes 10 according to embodiments of the invention need not comply with any particular regulatory standard, or with all elements or requirements of a particular regulatory standard, although some junction boxes 10 may be compliant with certain regulatory standards. That said, portions of this description may refer to the NEMA standards described above, and particularly to the NEMA Type 3 family (e.g., Type 3, Type 3R, Type 3S, etc.). The full text of these standards can be found in "Enclosures for Electrical Equipment (1000 Volts Maximum)," NEMA Standards Publication No. 250-2014, National Electrical Manufacturers Association, 2014, the contents of which are incorporated by reference herein in their entirety. In the following description, the term "the elements" refers generally to all of the things that a junction box 10 may protect against, including natural elements like rain, snow, and sleet, as well as other elements like dust and falling debris. When an embodiment or feature offers specific protection against a specific element or type of ingress, the element will be referred to specifically.

The junction box 10 of FIG. 1 is generally rectilinear in shape, with a back panel 14; two narrow side panels 16, 18 that are connected to the back panel 14 and arise generally perpendicularly from the back panel 14; a front panel 20 that is spaced from and generally parallel to the back panel 14; a bottom panel 22; and a top panel. The top panel is integrated with a cap 26, and will be described below. In the view of FIG. 1, the junction box 10 is mounted to the vertical surface 12 along its back panel 14. The arrangement of the back and front panels 14, 20 and the two side panels 16, 18, give the junction box 10 the overall shape of a rectangular prism in the illustrated embodiment. The front panel 20 is removable, as will be described below in more detail, in order to access the interior of the junction box 10. More specifically, the back panel 14, the side panels 16, 18, and the top and bottom panels 22, 24 form the body of the junction box 10 and the main part of its enclosure. The front panel 20 covers and closes the junction box 10. Overall, the junction box 10 is relatively thin with broad front and back panels 14, 20, relatively narrow side panels 16, 18, and narrow top and bottom panels 22, 24.

It should be understood that directional words, such as "top," "bottom," "left," and "right" are merely labels, used with respect to the coordinate system of FIG. 1 to distinguish one part of the junction box 10 from another. These parts may be oriented differently in other embodiments.

As was noted briefly above, the top panel is not visible in the view of FIG. 1; instead, the top panel is covered by a cap 26 that forms an overhang 28. The overhang 28 extends out and down over the upper portion of the front panel 20 and the two side panels 16, 18, and partially shields those panels from the elements. The cap 26 may be fixedly connected with the top panel in some embodiments, and it may be integrated with and serve as the top panel in other embodiments.

Figure 2:
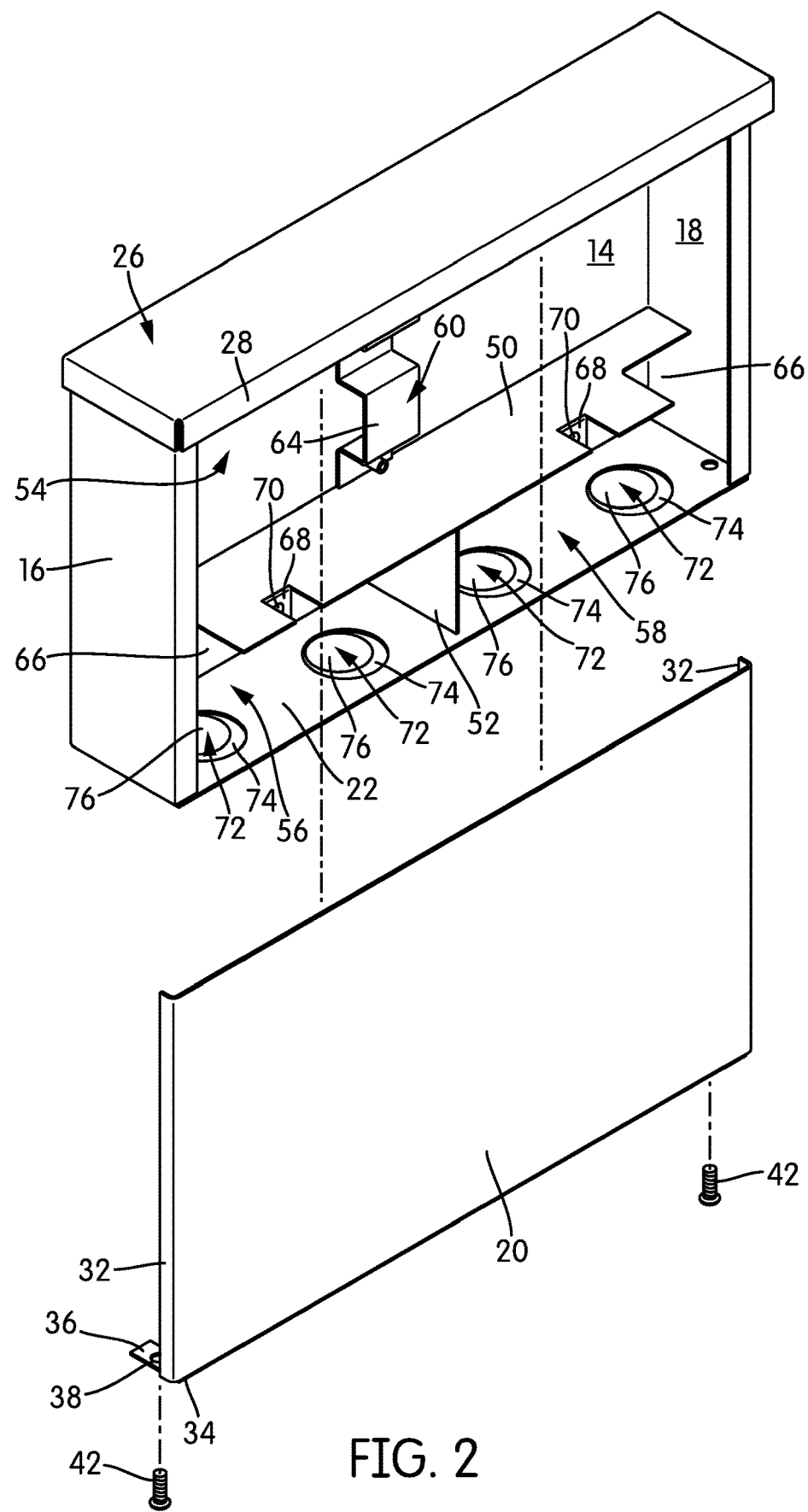
FIG. 2 is an exploded perspective view of the junction box of FIG. 1, illustrating its interior.

FIG. 2 is an exploded perspective view of the junction box 10. As shown, the upper end of the removable front panel 20 is adapted to slide under the cap 26 and its overhang 28, such that the junction box 10 is protected from the elements along that joint. The bottom and side edges of the front panel 20 bend over perpendicularly to form small overhangs 32, 34 that cover and protect the joints with the side panels 16, 18 and the bottom panel 22. These overhangs 32, 34 may serve to prevent ingress of the elements.

The front panel 20 has two tabs 36 that extend from its bottom-side corners. The tabs 36 carry fastener holes 38 that allow the front panel 20 to be secured to corresponding fastener holes 38 in the bottom panel 22 of the junction box 10. In some cases, the fastener holes 38 may be threaded, such that the front panel 20 can be secured with machine screws 42 without additional hardware. In other embodiments, a nut may be used along the interior of the junction box 10 instead of threaded holes. While machine screws 42 are shown in FIG. 2, essentially any means of securement may be used in other embodiments.

Other features may provide additional protection against ingress of the elements at the corners and joints of the junction box 10. For example, toward the front of the junction box 10, the left and right side panels 16, 18 bend inwardly, such that the front panel 20 will overlap them slightly when installed. This helps to avoid any gap between the coverage of the side panels 16, 18 and the coverage of the front panel, and may offer some protection against ingress of the elements.

In general, the junction box 10 may be made of any suitable material, including metals and plastics. Suitable metals may include steel, stainless steel, and aluminum. Suitable plastics include ABS and PVC, as well as composite resin materials, such as glass-fiber composites.

The back panel 14, side panels 16, 18, and top and bottom panels 22, 24 may be formed as one by any suitable manufacturing process, including casting, machining a block of material, bending sheet metal, stamping, laser cutting, or molding a resin, to name a few. Metal surfaces may be treated to prevent rust and resist corrosion, e.g., by galvanizing, anodizing, zinc plating, or powder coating. For example, a typical embodiment of the junction box 10 might be made of powder-coated sheet steel, in which case, the basic forms of the back panel 14, side panels 16, 18, and top and bottom panels 22, 24 would typically be bent from the same piece of sheet metal. Depending on the method of manufacture, the cap 26 with its overhang 28 may be formed with the other panels of the junction box 10 or it may be formed separately and welded, brazed, or otherwise attached to the other panels. If there are gaps between adjacent panels 14, 16, 18, 22, 24 of the junction box, the edges of the adjacent panels may be welded together, or otherwise sealed together, to prevent ingress of the elements. However, welding or sealing these joints may not be necessary in all cases; as can be seen in FIGS. 1 and 2, the joint between adjacent front and side portions of the overhang 28 is not welded or otherwise sealed.

Even if the edges of adjacent panels are not welded or otherwise sealed together, the various panels may be designed to overlap at their joints in order to eliminate gaps and to provide better protection against the elements.

Figure 3:
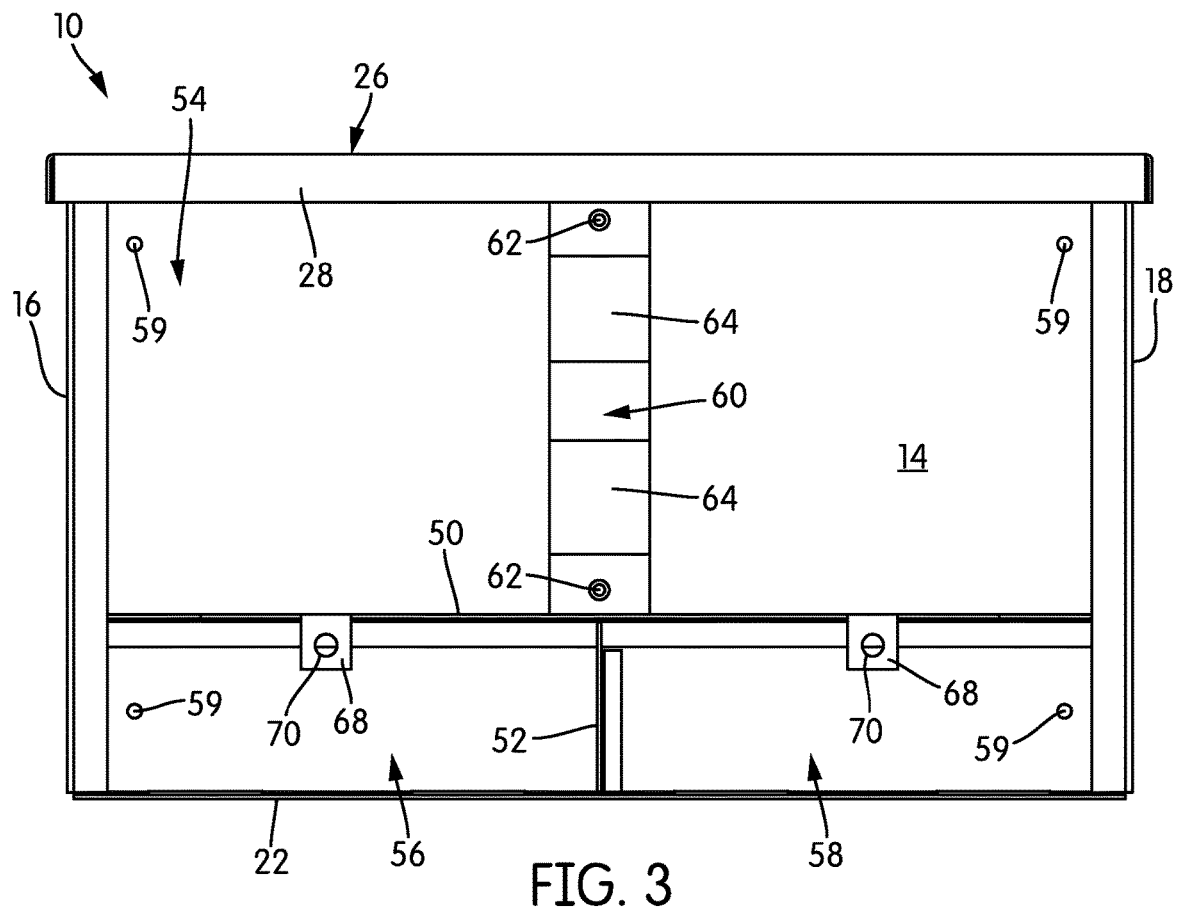
FIG. 3 is a front elevational view of the junction box of FIG. 1, shown with the front panel removed.

FIG. 3 is a front elevational view of the junction box 10 with the front panel 20 removed, showing its interior. As shown in FIGS. 2 and 3, the junction box 10 is divided by internal partitions 50, 52 into three compartments: a driver compartment 54 and two compartments 56, 58 for making connections to a driver in the driver compartment 54. In the illustrated embodiment, the driver compartment 54 is the largest compartment, and the two connection compartments 56, 58 are positioned below it, adjacent to the driver compartment 54, the bottom panel 22, and each other.

The driver compartment 54 typically has some built-in structure for securing a driver. That structure may be as simple as a pattern of pre-formed holes for mounting structure, like threaded posts, to secure one or more drivers, or it may be more complex, including all of the elements needed to secure a driver of a particular size. U.S. Pat. No. 9,951,934, which was incorporated by reference above, describes a large number of ways of securing a driver in a junction box, and any of those ways may be used in embodiments of the present invention.

In the illustrated embodiment, the driver compartment 54 includes a rigid bracket 60 that fits over threaded rods 62 provided in the back panel 14 of the junction box and can be secured with various types of fastening hardware, including wing nuts. The bracket 60, a wide ribbon of material, defines two separate locations for drivers to be mounted. As can be seen particularly in FIG. 2, the bracket 60 forms two inverted U-shapes 64, each of which defines a position for a driver. The junction box 10 may have one driver placed in it, two drivers placed in it, or more than two drivers placed in it, depending on the size of the junction box 10, the sizes of the drivers, and the particular application or installation. Of course, different brackets and other means of securement may be used in other embodiments.

While the above focuses on the mechanical structure needed to mount a driver in the junction box 10, in some cases, thermal interface structure may be provided in specific locations corresponding to the locations of the mechanical mounting hardware as well. For example, a thermal interface material or a thermal interface pad may be provided in the location or locations in which a driver is to be mounted. Drivers can generate significant heat and a thermal interface would allow a driver to use the junction box 10 to dissipate heat.

The two connection compartments 56, 58 are mirror images of one another in the illustrated embodiment, and are arranged such that either compartment may serve as a high-voltage compartment and either compartment may serve as a low-voltage compartment. The internal partition 50 that divides the two compartments 56, 58 from the driver compartment 54 extends the entire width of the junction box 10. In each corner, the partition 50 includes a cut-out 66 with rounded corners that allows wires from the driver to enter each compartment 56, 58. In each compartment, an upper portion of the internal partition 50 is bent down into a tab 68 with a threaded hole 70 that can serve as a location for a grounding screw, to ground the driver to the junction box 10.

The internal partition 52 that divides the two connection compartments 56, 58 from one another is centered in the junction box 10 and runs between and perpendicular to the first internal partition 50 and the bottom panel 22, such that the two connection compartments 56, 58 have equal sizes. The two internal partitions 50, 52 may, for example, be welded, spot welded, riveted, adhered, or otherwise fixed within the junction box 10. As can be seen particularly in FIG. 2, the two partitions 50, 52 do not extend the full depth of the junction box 10, although they may extend nearly the full depth of the junction box 10 in some cases.

The internal arrangement shown in FIGS. 2 and 3 is only one example of an internal arrangement for a junction box according to embodiments of the invention. In other cases, the size and location of compartments may vary, as may the number of connection compartments 56, 58. More specifically, the junction box 10 has one compartment for low-voltage connections and one compartment for high-voltage connections. If the driver compartment 56 provides space and hardware to mount more than one driver, a set of high- and low-voltage compartments may be provided for each driver. Although regulatory requirements may only require one compartment for high-voltage connections and one compartment for low-voltage connections, it may be more convenient for the user in some cases if multiple compartments for each are provided.

Each of the connection compartments 56, 58 provides for openings that allow wires to enter and leave the junction box 10. In some cases, junction boxes 10 according to embodiments of the invention may be provided with openings in specific locations. However, in most cases, it is more advantageous if the junction boxes 10 are manufactured with prospective openings, usually called "knock-outs," that can be used to form openings at any of several locations.

In another possible variation on the arrangement of the junction box 10, the compartments 56, 58 could be located on the left and right sides, respectively, of the junction box 10, one on either side of the larger driver compartment 54. However, there is a particular advantage to the arrangement of the junction box 10 shown in the figures: the installer can access all of the openings or knock-outs that allow wires to enter and leave the junction box 10 from all of the compartments 56, 58 from a single panel—the bottom panel 22. This arrangement also means that in a typical installation, only the front and bottom panels need have enough clearance between the junction box 10 and objects around it for the user to work; the sides and top may be relatively close to adjacent objects.

FIG. 3 also illustrates another feature: the four small openings 59 in the back panel 14 that allow the junction box 10 to be mounted to a vertical surface 12. These openings 59 are positioned roughly at the four corners of the back panel 14, and are intended to allow fasteners, such as screws or nails, to pass through the junction box 10 and into the mounting surface 12. Of course, there are many ways in which a junction box 10 may be attached to a surface 12. For example, as an alternative to fasteners, an external mounting bracket that clamps the junction box 10 in place could be used, as could adhesives. In some cases, external structure may be mounted on the junction box 10 for mounting purposes. This may be particularly helpful where openings in the junction box 10, however small, might compromise the ability of the junction box 10 to resist the elements.

Figure 4:
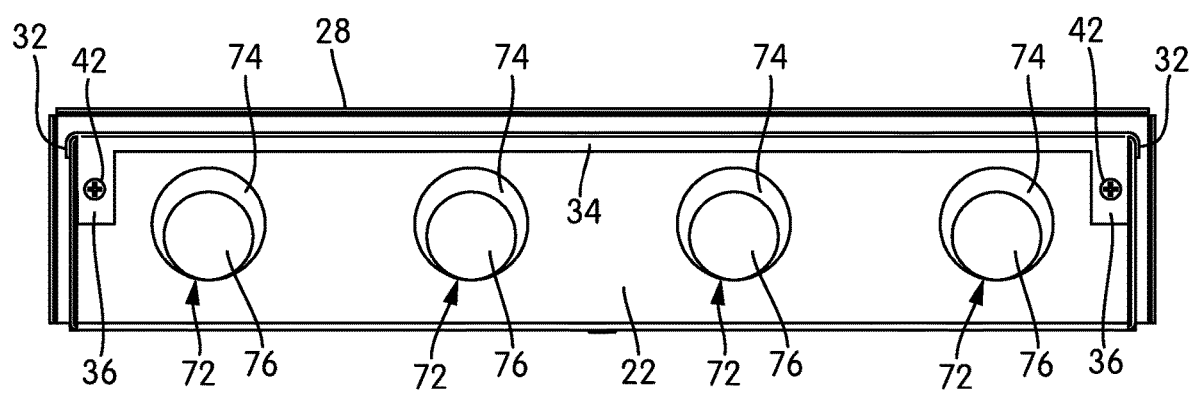
FIG. 4 is a bottom view of the junction box of FIG. 1.

FIG. 4, a bottom view of the junction box 10, illustrates the bottom panel 22, which has four knock-outs 72, arranged so that there are two knock-outs 72 for each of the connection compartments 56, 58. The number of knock-outs 72 may vary from embodiment to embodiment, there may be more or fewer knock-outs 72 overall, or there may be more or fewer knock-outs 72 for a particular compartment 56, 58 or compartments 56, 58. Generally speaking, the more knock-outs 72 are present, the larger the compartments 56, 58 will be to accommodate the wires for those connections.

The knock-outs 72 of the illustrated embodiment have an additional feature: with each knock-out 72, an opening can be made in either of two different sizes. Each knock-out 72 is comprised of a larger knock-out circle 74 and a smaller knock-out circle 76. The larger and smaller knock-out circles 74, 76 are arranged as non-concentric tangent circles, although nested knock-out circles may be used in other embodiments.

Figure 5:
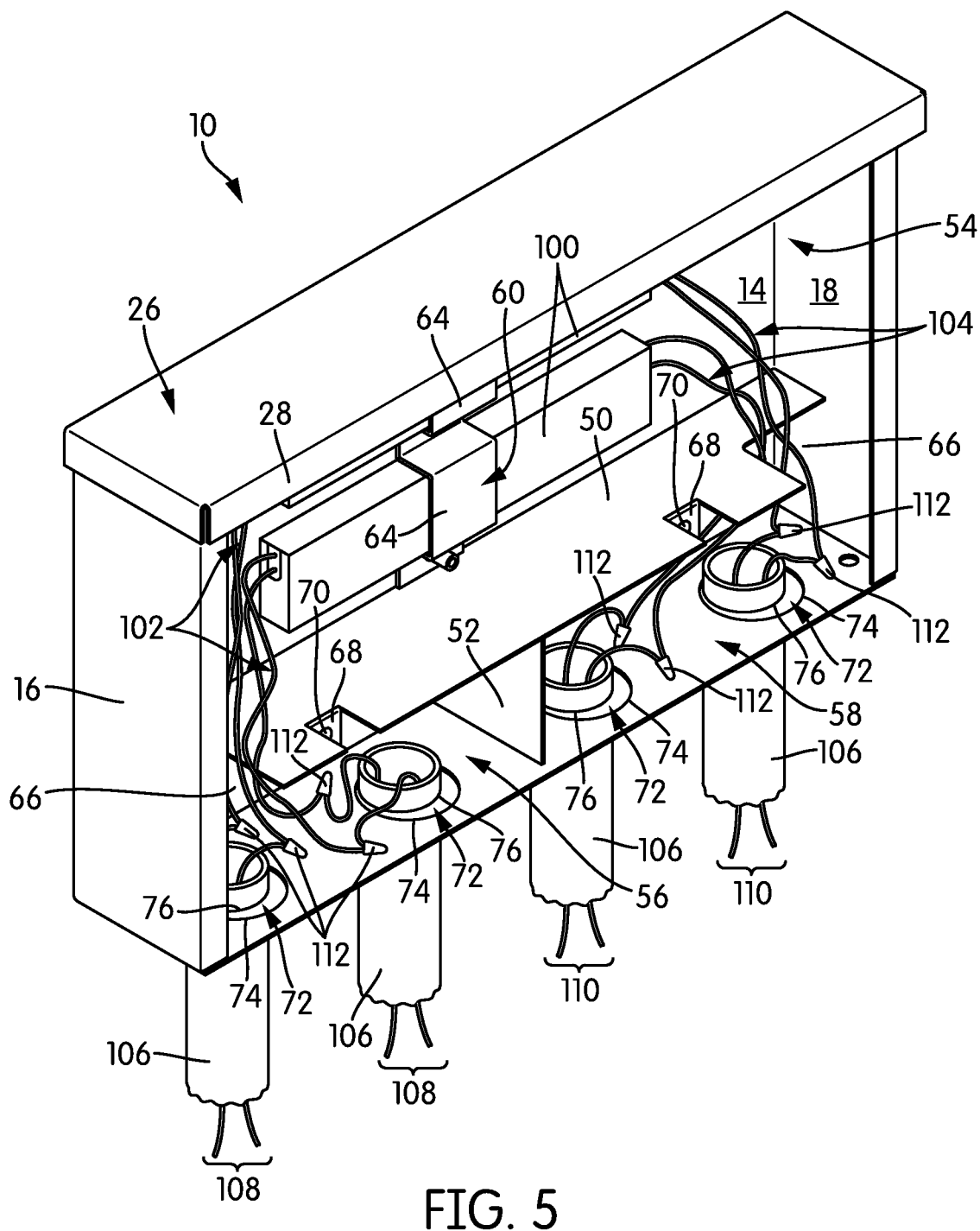
FIG. 5 is a perspective view of the junction box of FIG. 1 with the front panel removed, showing its interior with drivers installed.

FIG. 5 is a perspective view of the junction box 10 with the front panel 20 removed, similar to the view of FIG. 2. In the view of FIG. 5, two drivers 100 are installed. In the illustrated embodiment, the two drivers 100 are the same size, although drivers of different sizes may be used in different embodiments. Each driver 100 has a set of high-voltage wires 102 and a set of low-voltage wires 104. Although not present in the view of FIG. 5, the set of high-voltage wires 102 of many drivers will include a ground wire that, as described above attaches to the grounding tabs 68 to ground the driver 100 to the junction box 10.

All of the high-voltage wires 102 enter one compartment 56. All of the low-voltage wires 104 enter the other compartment 58. In each compartment 56, 58, the smaller knock-out circle 76 has been removed from each knock-out 72, and a conduit 106 connects to the junction box 10 at each of those locations. In an actual installation, structure would be used to secure the conduits 106 in place; that structure has been omitted in the view of FIG. 5 for clarity. Within the compartments, the wires 102, 104 from the drivers 100 are joined to external sets of wires 108, 110 using wire nuts 112 or other means of connection. The external wires 108, 110 exit the junction box 100 through the conduits 106.

As a matter of pure design, there is no particular limitation on the size of the compartments 54, 56, 58 or the size of the knock-outs 72. However, as a practical matter, it is helpful if the driver compartment 54 is large enough to house one or more standard drivers and the connection compartments 56, 58 are large enough both to accommodate the necessary wires and connection hardware and to allow an installer's fingers to fit in the connection compartments 56, 58 while making connections. As may be apparent from the view of FIG. 5, the number of wires and the accompanying wire nuts or other connection hardware can consume considerable space. Regulatory standards may require that the connection compartments 56, 58 have certain minimum volumes, and in some cases, those volumes may be dictated according to the number of knock-outs 72 in the junction box 10. In one embodiment, the junction box 10 may have a main width of 263 mm (10.35 in), a main height of 160 mm (6.3 in) and a main depth of 48 mm (1.89 in). The cap 26 and its overhang 28 may add about 7 mm (0.28 in) in depth and about 11 mm (0.43 in) in width.

As those of skill in the art will realize from the above description and FIGS. 1-5, the junction box 10 is not completely sealed against the elements. Moreover, the ability of the junction box 10 to resist the elements is, in some ways, dependent on its orientation when installed. The cap 26 and its overhang 28, for example, provide specific protection for rain, sleet, snow, dust, and other such matter that falls straight down on the junction box 10. The overlaps between the front panel 20 and the side panels 16, 18, as well as between the front panel 20 and the bottom panel 22, may provide protection against elements that are blown at the junction box 10 from other angles.

While the invention has been described with respect to certain embodiments, the description is intended to be exemplary, rather than limiting. Modifications and changes may be made within the scope of the invention, which is defined by the appended claims.

What is claimed is:

1. A junction box, comprising:
   a back panel, the back panel having mounting structure;
   top, bottom, left, and right sidewall panels that extend from the back panel to define an enclosure;
   a removable front panel adapted to be secured to one or more of the sidewall panels to cover and close the enclosure;
   a cap fixedly attached to or serving as the top panel, the cap having an overhang that extends out and down over top portions of the left, right, and front panels, the overhang having a greater width and depth than the bottom sidewall panel and forming an awning over the top portions of the left, right, and front panels; and
   one or more partitions within the enclosure that divide the enclosure into a driver compartment and two or more connection compartments, each of the two or more connection compartments having at least one external opening or a knock-out for the opening.

2. The junction box of claim 1, wherein the one or more partitions comprise a first partition that extends from the left sidewall to the right sidewall and a second partition that extends perpendicularly from the first partition to the bottom panel.

3. The junction box of claim 2, wherein the two or more connection compartments comprise two connection compartments defined between the first partition and the bottom panel such that they are adjacent to one another and to the driver compartment.

4. The junction box of claim 3, wherein the at least one opening or the knock-out for the opening for each of the connection compartments is in the bottom panel.

5. The junction box of claim 2, wherein the first partition includes an opening on each side to allow wires to pass from the driver compartment into the two or more connection compartments.

6. The junction box of claim 2, wherein each of the two or more connection compartments includes a grounding tab with an opening for a grounding screw.

7. The junction box of claim 1, wherein the removable front panel and the left and right sidewall panels are structured to overlap at joints therebetween.

8. The junction box of claim 1, wherein the mounting structure comprises one or more openings in the back panel.

9. The junction box of claim 1, wherein the junction box has the overall shape of a rectangular prism.

10. The junction box of claim 1, wherein the one or more partitions are arranged such that the driver compartment is larger than the two or more connection compartments.

11. The junction box of claim 10, wherein the one or more partitions are arranged such that the two or more connection compartments are positioned below the driver compartment, adjacent to the driver compartment, the bottom panel, and each other.

12. The junction box of claim 1, further comprising at least one cut-out in the one or more partitions for each of the two or more connection compartments, the at least one cut-out providing a path for wires from the driver compartment to enter each of the two or more connection compartments.

13. The junction box of claim 1, wherein the driver compartment includes driver-mounting structure.

14. The junction box of claim 13, wherein the driver-mounting structure includes a bracket and structure that releasably secures the bracket.

\* \* \* \* \*